UNITED STATES PATENT OFFICE.

LOUIS M. DENNIS, OF ITHACA, NEW YORK.

METHOD OF SEPARATING AN AROMATIC SULFONIC ACID FROM SULFURIC ACID AND OF OBTAINING THE SULFONIC ACID IN SOLID FORM.

1,228,414.

Specification of Letters Patent.

Patented June 5, 1917.

No Drawing.

Application filed November 20, 1916. Serial No. 132,339.

*To all whom it may concern:*

Be it known that I, LOUIS M. DENNIS, a citizen of the United States of America, residing at the city of Ithaca, Tompkins county, State of New York, have invented a new and useful Method of Separating an Aromatic Sulfonic Acid from Sulfuric Acid and of Obtaining the Sulfonic Acid in Solid Form, of which the following is a specification.

My invention relates to a method of separating a sulfonic acid of a hydrocarbon of the aromatic series from sulfuric acid and of obtaining the sulfonic acid in solid form. I shall illustrate my invention by describing a method of making a naphthalene sulfonic acid, specifically naphthalene beta-sulfonic acid, the forming of its sodium salt and the conversion of the latter into naphthol, specifically beta-naphthol, although the invention is not restricted to the making of this particular sulfonic acid, or to the making of any particular salt or hydroxy derivative thereof.

So far as I am aware the sulfonic acid of a hydrocarbon of the aromatic series, such as naphthalene sulfonic acid, specifically naphthalene beta-sulfonic acid, has not hitherto been isolated as such in solid form in commercial practice. The usual commercial method of producing beta-naphthol, for example, in the course of which naphthalene beta-sulfonic acid is formed but not isolated has been as follows: Napthalene has been heated with an excess of concentrated sulfuric acid to a relatively high temperature, say 160° C. for a sufficient length of time to convert the naphthalene into naphthalene beta-sulfonic acid in the presence of an excess of sulfuric acid. Lime has been added to this mixture of sulfuric acid and naphthalene beta-sulfonic acid, forming calcium sulfate and calcium naphthalene beta-sulfonate. The difficultly soluble calcium sulfate is separated in solid form from the solution of the calcium naphthalene beta-sulfonate by filtration. This method of the separation of the two salts is, however, not sharp, and to avoid appreciable loss of the calcium naphthalene beta-sulfonate, it is usually necessary to repeatedly wash the calcium sulfate with water to remove the calcium naphthalene beta-sulfonate adhering thereto. Sodium carbonate may now be added to the solution of the calcium naphthalene beta-sulfonate whereupon that compound is converted into sodium naphthalene beta-sulfonate and the calcium is precipitated as calcium carbonate. The sodium naphthalene beta-sulfonate is readily soluble in water while calcium carbonate is not soluble in water. Separation of the two salts may therefore be effected by treating the mixture of them with water and separating the solution of the sodium naphthalene beta-sulfonate from the solid calcium carbonate by filtration. The dilute solution of sodium naphthalene beta-sulfonate must then be evaporated to dryness and the resulting solid sodium naphthalene beta-sulfonate fused with sodium hydroxid which converts the salt into sodium beta-naphtholate. Beta-naphthol may be liberated from this compound by treatment with a suitable acid, such as sulfuric acid.

It will be observed that the excess of sulfuric acid which has not reacted with the naphthalene is converted into the comparatively valueless calcium sulfate and thus lost.

By my method I avoid the use of lime and consequent production of calcium sulfate; I avoid the consequent necessary separation by filtration; I avoid the evaporation of dilute solution and recover the excess of sulfuric acid which has not reacted with the naphthalene. I furthermore directly and economically produce as an isolated product, naphthalene sulfonic acid, specifically naphthalene beta-sulfonic acid, in solid form.

In carrying out my method I treat, at an elevated temperature, the mixture of naphthalene beta-sulfonic acid and sulfuric acid, formed as above stated, with a solvent such as toluene, which has the property of dissolving the naphthalene beta-sulfonic acid but not of dissolving any appreciable amount of sulfuric acid. The solvent also possesses the property of dissolving an appreciably greater amount of naphthalene beta-sulfonic acid at high temperature, say at 100° C., than it does at low temperature, say at 5° C. The hot solution of naphthalene beta-sulfonic acid in toluene, which separates from the residual sulfuric acid in a distinct layer, after separation from the sulfuric acid, is then cooled, whereupon the naphthalene beta-sulfonic acid separates out from its solvent, in this case toluene, in solid form and is freed from the toluene by any suitable method, such as filtration. I have found a cooling to 5° C. to give good results. The solid naphthalene beta-sulfonic acid is then freed from any small amount of the solvent which may still adhere to it, either by evaporation, or by subjecting it to the action of a centrifuge, or by other suitable means. It may then be sold on the market as such or further treated to produce beta-naphthol.

If it is desired to convert it into beta-naphthol, the sodium salt of naphthalene beta-sulfonic acid may be prepared by adding to the acid obtained as above, the calculated amount of a sodium compound, such as sodium hydroxid, sodium carbonate, sodium bicarbonate or sodium sulfite or other suitable sodium compound, or mixtures of them, and then fusing said sodium salt with the calculated amount of sodium hydroxid to form sodium beta-naphtholate. This latter may be treated with an acid, such as sulfuric acid, in the usual way to form beta-naphthol. If the sodium naphthalene beta-sulfonate is in a water solution, the water must of course be removed before the fusion.

Instead of treating the acid with the calculated amount of sodium compound and obtaining the sodium salt of the naphthalene beta-sulfonic acid and then fusing this with sodium hydroxid to form sodium beta-naphtholate, one may add the acid directly, in dry form, to the solid sodium compound, the latter being in an amount sufficient to convert the naphthalene beta-sulfonic acid to sodium beta-naphtholate when the mixture is heated to the proper temperature. In this latter case sodium naphthalene beta-sulfonate is not formed separately. Beta-naphthol may then be formed from the sodium beta-naphtholate thus obtained, in the usual way.

The solvent, such as toluene, after being freed from the naphthalene beta-sulfonic acid may be used again in the extraction of further portions of the acid from a fresh mixture of the same with sulfuric acid. The sulfuric acid which remains after the naphthalene beta-sulfonic acid has been removed from it by the solvent is drawn off and used for any desired purpose.

It is obvious that solvents other than toluene may be used to dissolve the naphthalene beta-sulfonic acid provided they have the property of dissolving said acid but of not dissolving any appreciable amount of sulfuric acid, and of dissolving appreciably greater amounts of naphthalene beta-sulfonic acid at high temperatures than at low temperatures. It is also of advantage if the solvent is not miscible with water to any appreciable degree.

It is further obvious that the invention is not to be restricted to the making of naphthalene beta-sulfonic acid and its salts and derivatives nor to the sodium salt of such acid, but has general application to the sulfonic acids of the hydrocarbons of the aromatic series.

Where I use the term "insoluble" I use it in its relative sense meaning that there is no appreciable solubility, and where I speak of the solvent, such as toluene, as "not dissolving" sulfuric acid, I mean not dissolving any appreciable amount.

I claim:

1. A method of separating a sulfonic acid of a hydrocarbon of the aromatic series from sulfuric acid and of obtaining the sulfonic acid in solid form, consisting in treating a mixture of the acids with a solvent which dissolves the sulfonic acid but not the sulfuric acid and which dissolves an appreciably greater amount of the sulfonic acid at high temperature than it does at low temperature, separating the sulfonic acid solution from the sulfuric acid and cooling said solution.

2. A method of separating a sulfonic acid of a hydrocarbon of the aromatic series from sulfuric acid and of obtaining the sulfonic acid in solid form, consisting in treating a mixture of the acids with a solvent which dissolves the sulfonic acid but not the sulfuric acid, which dissolves an appreciably greater amount of the sulfonic acid at high temperature than it does at low temperature and which is not appreciably miscible with water, separating the sulfonic acid solution from the sulfuric acid and cooling the solution.

3. A method of separating a sulfonic acid of a hydrocarbon of the aromatic series from sulfuric acid and of obtaining the sulfonic acid in solid form, consisting in treating a mixture of the acids with an organic solvent which dissolves the sulfonic acid but not the sulfuric acid and which dissolves an appreciably greater amount of the sulfonic acid at high temperature than it does at low temperature, separating the sulfonic acid solution from the sulfuric acid and cooling said solution.

4. A method of separating a sulfonic acid of a hydrocarbon of the aromatic series from sulfuric acid and of obtaining the sulfonic acid in solid form, consisting in treating a mixture of the acids with an organic solvent which dissolves the sulfonic acid but not the sulfuric acid, which dissolves an appreciably greater amount of the sulfonic acid at high temperature than it does at low temperature and which is not appreciably miscible with water, separating the sulfonic acid solution from the sulfuric acid and cooling the solution.

5. A method of separating a sulfonic acid of a hydrocarbon of the aromatic series from sulfuric acid and of obtaining the sulfonic acid in solid form, consisting in treating a mixture of the acids with toluene, separating the toluene solution of sulfonic acid from the sulfuric acid and cooling said solution.

6. A method of separating a naphthalene sulfonic acid from sulfuric acid and of obtaining the sulfonic acid in solid form, consisting in treating a mixture of the acids with a solvent which dissolves the sulfonic acid but not the sulfuric acid and which dissolves an appreciably greater amount of the sulfonic acid at high temperature than it does at low temperature, separating the sulfonic acid solution from the sulfuric acid and cooling said solution.

7. A method of separating a naphthalene sulfonic acid from sulfuric acid and of obtaining the sulfonic acid in solid form, consisting in treating a mixture of the acids with a solvent which dissolves the sulfonic acid but not the sulfuric acid, which dissolves an appreciably greater amount of the sulfonic acid at high temperature than it does at low temperature and which is not appreciably miscible with water, separating the sulfonic acid solution from the sulfuric acid and cooling the solution.

8. A method of separating a naphthalene sulfonic acid from sulfuric acid and of obtaining the sulfonic acid in solid form, consisting in treating a mixture of the acids with an organic solvent which dissolves the sulfonic acid but not the sulfuric acid and which dissolves an appreciably greater amount of the sulfonic acid at high temperature than it does at low temperature, separating the sulfonic acid solution from the sulfuric acid and cooling said solution.

9. A method of separating a naphthalene sulfonic acid from sulfuric acid and of obtaining the sulfonic acid in solid form, consisting in treating a mixture of the acids with an organic solvent which dissolves the sulfonic acid but not the sulfuric acid, which dissolves an appreciably greater amount of the sulfonic acid at high temperature than it does at low temperature and which is not appreciably miscible with water, separating the sulfonic acid solution from the sulfuric acid and cooling said solution.

10. A method of separating a naphthalene sulfonic acid from sulfuric acid and of obtaining the sulfonic acid in solid form, consisting in treating a mixture of the acids with toluene, separating the toluene solution of sulfonic acid from the sulfuric acid and cooling said solution.

11. A method of separating naphthalene beta-sulfonic acid from sulfuric acid and of obtaining the sulfonic acid in solid form, consisting in treating a mixture of the acids with a solvent which dissolves the sulfonic acid but not the sulfuric acid and which dissolves an appreciably greater amount of the sulfonic acid at high temperature than it does at low temperature, separating the sulfonic acid solution from the sulfuric acid and cooling said solution.

12. A method of separating naphthalene beta-sulfonic acid from sulfuric acid and of obtaining the sulfonic acid in solid form, consisting in treating a mixture of the acids with a solvent which dissolves the sulfonic acid but not the sulfuric acid, which dissolves an appreciably greater amount of the sulfonic acid at high temperature than it does at low temperature and which is not appreciably miscible with water, separating the sulfonic acid solution from the sulfuric acid and cooling the solution.

13. A method of separating naphthalene beta-sulfonic acid from sulfuric acid and of obtaining the sulfonic acid in solid form, consisting in treating a mixture of the acids with an organic solvent which dissolves the sulfonic acid but not the sulfuric acid and which dissolves an appreciably greater amount of the sulfonic acid at high temperature than it does at low temperature, separating the sulfonic acid solution from the sulfuric acid and cooling said solution.

14. A method of separating naphthalene beta-sulfonic acid from sulfuric acid and of obtaining the sulfonic acid in solid form, consisting in treating a mixture of the acids with an organic solvent which dissolves the sulfonic acid but not the sulfuric acid, which dissolves an appreciably greater amount of the sulfonic acid at high temperature than it does at low temperature and which is not appreciably miscible with water, separating the sulfonic acid solution from the sulfuric acid and cooling the solution.

15. A method of separating naphthalene beta-sulfonic acid from sulfuric acid and of obtaining the sulfonic acid in solid form, consisting in treating a mixture of the acids with toluene, separating the toluene solution of sulfonic acid from the sulfuric acid and cooling said solution.

In testimony whereof I have signed this specification.

LOUIS M. DENNIS.